(12) United States Patent
Agnihotram et al.

(10) Patent No.: US 11,442,975 B2
(45) Date of Patent: Sep. 13, 2022

(54) SYSTEM AND METHOD FOR GENERATING ABSTRACTIVE SUMMARY

(71) Applicant: Wipro Limited, Bangalore (IN)

(72) Inventors: Gopichand Agnihotram, Bangalore (IN); Meenakshi Sundaram Murugeshan, Bangalore (IN)

(73) Assignee: Wipro Limited, Bangalore (IN)

(*) Notice: Subject to any disclaimer, the term of this patent is extended or adjusted under 35 U.S.C. 154(b) by 334 days.

(21) Appl. No.: 16/515,436

(22) Filed: Jul. 18, 2019

(65) Prior Publication Data
US 2020/0387531 A1  Dec. 10, 2020

(30) Foreign Application Priority Data
Jun. 4, 2019 (IN) .............................. 201941022154

(51) Int. Cl.
| | |
|---|---|
| G06F 16/00 | (2019.01) |
| G06F 16/34 | (2019.01) |
| G06F 16/901 | (2019.01) |
| G06F 16/33 | (2019.01) |
| G06F 40/284 | (2020.01) |

(52) U.S. Cl.
CPC ........ *G06F 16/345* (2019.01); *G06F 16/3344* (2019.01); *G06F 16/9024* (2019.01); *G06F 40/284* (2020.01)

(58) Field of Classification Search
CPC ............... G06F 16/345; G06F 16/3344; G06F 16/9024; G06F 40/284
USPC ....................................................... 707/722
See application file for complete search history.

(56) References Cited

U.S. PATENT DOCUMENTS

| | | | |
|---|---|---|---|
| 2008/0221892 A1* | 9/2008 | Nathan | G06F 40/35 704/257 |
| 2010/0115003 A1* | 5/2010 | Soules | G06F 16/904 707/822 |
| 2014/0372102 A1 | 12/2014 | Hagege et al. | |

(Continued)

FOREIGN PATENT DOCUMENTS

CN  107491434 A  12/2017

OTHER PUBLICATIONS

Niu Kai, et al., machine translated document of CN 107491434, pp. 17, Dec. 19, 2017.*

(Continued)

*Primary Examiner* — Monica M Pyo
(74) *Attorney, Agent, or Firm* — Finnegan, Henderson, Farabow, Garrett & Dunner, LLP

(57) ABSTRACT

The present invention relates to a method for generating abstractive summary. The method comprises receiving a query for generating an abstractive summary from a document and splitting the query into one or more lexical units. Further, a semantic graph and a graph index is generated based on a role assigned to the one or more lexical units. Furthermore, a measure of information is determined for the retrieved one or more sentences. The one or more sentences having a semantic graph analogous to the generated semantic graph of the query are retrieved from the document. Finally, at least one of re-ordering and re-phrasing is performed on at least one of the retrieved one or more sentences based on the computed measure of information and the one or more lexical units in the retrieved one or more sentences to generate the abstractive summary.

13 Claims, 8 Drawing Sheets

(56) References Cited

U.S. PATENT DOCUMENTS

| | | | | |
|---|---|---|---|---|
| 2015/0356201 A1* | 12/2015 | Kothe | ................ | G06F 16/2237 |
| | | | | 707/741 |
| 2016/0171388 A1* | 6/2016 | Sanchez | ................ | G06N 5/043 |
| | | | | 706/12 |
| 2016/0171389 A1* | 6/2016 | Sanchez | ................ | G06N 20/00 |
| | | | | 706/12 |
| 2016/0260025 A1* | 9/2016 | Goldberg | ................ | G06N 5/02 |

OTHER PUBLICATIONS

Gunning, D., "Explainable Artificial Intelligence (XAI)", DARPA, Mar. 2019, pp. 1-18.

Samek, W., et al., "Explaninable Artificial Intelligence: Understanding, Visualizing and Interpreting Deep Learning Models", ITU Journal: ICT Discoveries, Special Issue No. 1, Oct. 13, 2017, pp. 1-10.

Silva, V., et al., "Building a Knowledge Graph from Natural Language Definitions for Interpretable Text Entailment Recognition", Proceedings of the Eleventh International Conference on Language Resources and Evaluation, Jun. 20, 2018, 5 pages.

\* cited by examiner

| ROLE | DEFINITION | EXAMPLE |
|---|---|---|
| AGENT | The volitional causer of an event | The [waiter] spilled the soup. |
| EXPERIENCER | The experiencer of an event | [John] has a headache. |
| FORCE | The non-volitional causer of the event | [The wind] blows debris from the mall into our yards. |
| THEME | The participant most directly affected by an event | Only after Benjamin Franklin broke the [ice] |
| RESULT | The end product of an event | The city built a [regulation-size baseball diamond]. |
| CONTENT | The proposition or content of a propositional event | Mona asked "[You met Mary Ann at a supermarket?]". |
| INSTRUMENT | An instrument used in an event | He poached catfish, stunning them with a [shocking device]. |
| BENEFICIARY | The beneficiary of an event | Whenever Ann Callahan makes hotel reservations [for her boss]. |
| SOURCE | The origin of the object of a transfer event | I flew in [from Boston]. |
| GOAL | The destination of an object of a transfer event | I drove [to Portland]. |

FIGURE 4

SYSTEM AND METHOD FOR GENERATING ABSTRACTIVE SUMMARY

TECHNICAL FIELD

The present disclosure relates to the field of natural language generation (NLG). Particularly, but not exclusively, the present disclosure relates to a system and method for generating abstractive summary.

BACKGROUND

Generally, abstractive summary generation pertains to summarization of information provided in a document. The abstractive summary retains the necessary information from the document. The document summarization techniques create a representative summary or an abstract of the entire document by retrieving the most informative sentences in the document. For generating abstractive summaries, the retrieved sentences are represented semantically, and a natural language generation technique is used to create abstractive summary.

An issue with the existing techniques is the lack of ability to retrieve the one or more sentences from a document based on the semantic graph and graph index data.

An issue with the existing techniques is the lack of ability to identify and remove multiple sentences conveying same information for generating abstractive summary. Hence, in the existing techniques, although summary is generated, the summary may not provide clarity of information required by a user.

The information disclosed in this background of the disclosure section is only for enhancement of understanding of the general background of the invention and should not be taken as an acknowledgement or any form of suggestion that this information forms the prior art already known to a person skilled in the art.

SUMMARY

One or more shortcomings of the prior art are overcome, and additional advantages are provided through the provision of method of the present disclosure.

Additional features and advantages are realized through the techniques of the present disclosure. Other embodiments and aspects of the disclosure are described in detail herein and are considered a part of the claimed disclosure.

Disclosed herein is a method for generating abstractive summary. In an embodiment, the method includes receiving a query for generating an abstractive summary from a document among a plurality of documents stored in a document database and splitting the query into one or more lexical units. Further, the method includes generating a semantic graph and a graph index based on a role assigned to the one or more lexical units in the query. Furthermore, the method includes determining a measure of information of retrieved one or more sentences from the document, wherein the one or more sentences having a semantic graph analogous to the generated semantic graph of the query are retrieved from the document. Finally, the method includes performing at least one of re-ordering and re-phrasing of at least one of the retrieved one or more sentences based on the computed measure of information and the one or more lexical units in the retrieved one or more sentences to generate the abstractive summary.

Further, the present disclosure discloses a summary generation unit, for generating abstractive summary. In an embodiment, the summary generation unit includes a processor and a memory communicatively coupled to the processor, wherein the memory stores the processor executable instructions, which, on execution, causes the processor to receive a query for generating the abstractive summary from a document among a plurality of documents stored in a document database and splitting the query into one or more lexical units. Further, the processor is configured to generate a semantic graph and a graph index based on a role assigned to the one or more lexical units in the query. Furthermore, the processor is configured to determine a measure of information of retrieved one or more sentences from the document, wherein the one or more sentences having a semantic graph analogous to the generated semantic graph of the query are retrieved from the document. Finally, the processor is configured to perform at least one of re-ordering and re-phrasing of at least one of the retrieved one or more sentences based on the computed measure of information and the one or more lexical units in the retrieved one or more sentences to generate the abstractive summary.

The foregoing summary is illustrative only and is not intended to be in any way limiting. In addition to the illustrative aspects, embodiments, and features described above, further aspects, embodiments, and features may become apparent by reference to the drawings and the following detailed description.

BRIEF DESCRIPTION OF THE ACCOMPANYING DRAWINGS

The novel features and characteristic of the disclosure are set forth in the appended claims. The disclosure itself, however, as well as a preferred mode of use, further objectives and advantages thereof, may best be understood by reference to the following detailed description of an illustrative embodiment when read in conjunction with the accompanying drawings. The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. One or more embodiments are now described, by way of example only, with reference to the accompanying figures wherein like reference numerals represent like elements and in which:

FIG. 4 shows an exemplary table illustrating role and definition of terms in the English language, in accordance with some embodiments of the present disclosure;

Figure 7A:
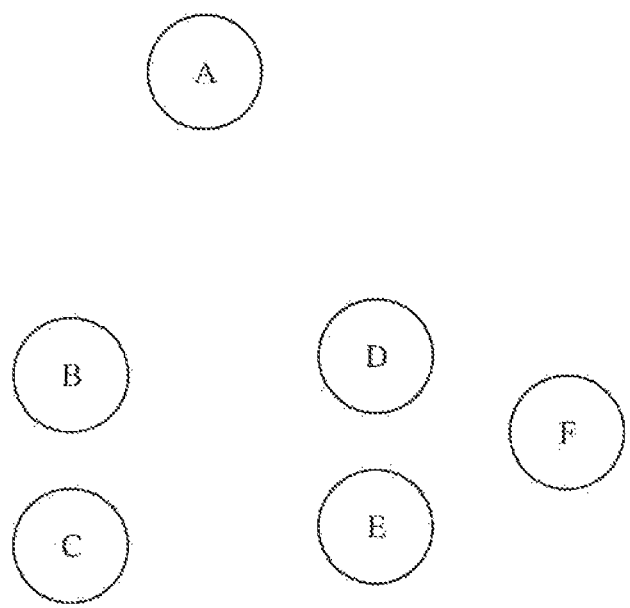
FIG. 7A shows exemplary data points for hierarchical clustering, in accordance with some embodiments of the present disclosure.
Figure 7B:
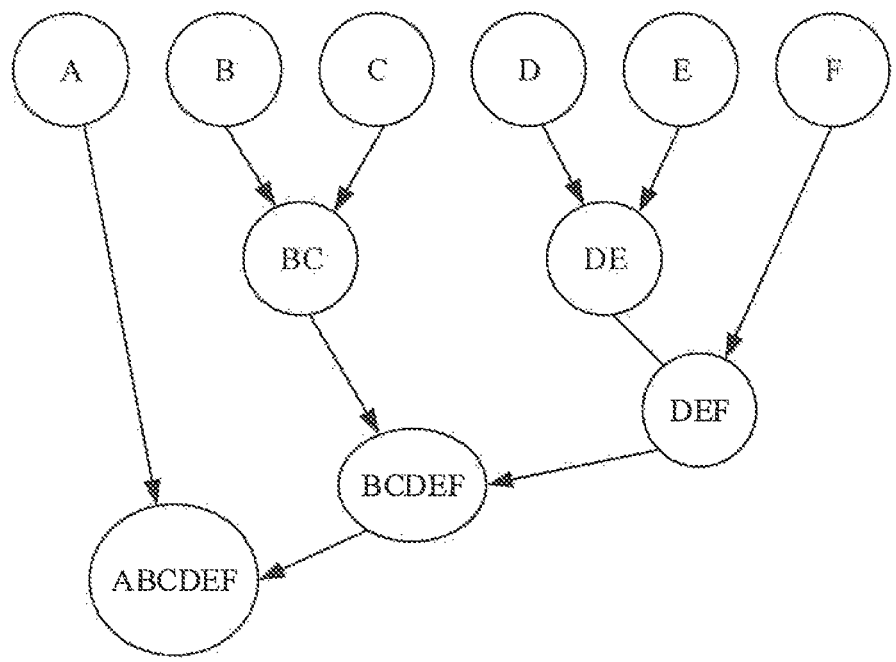
Figure 8:
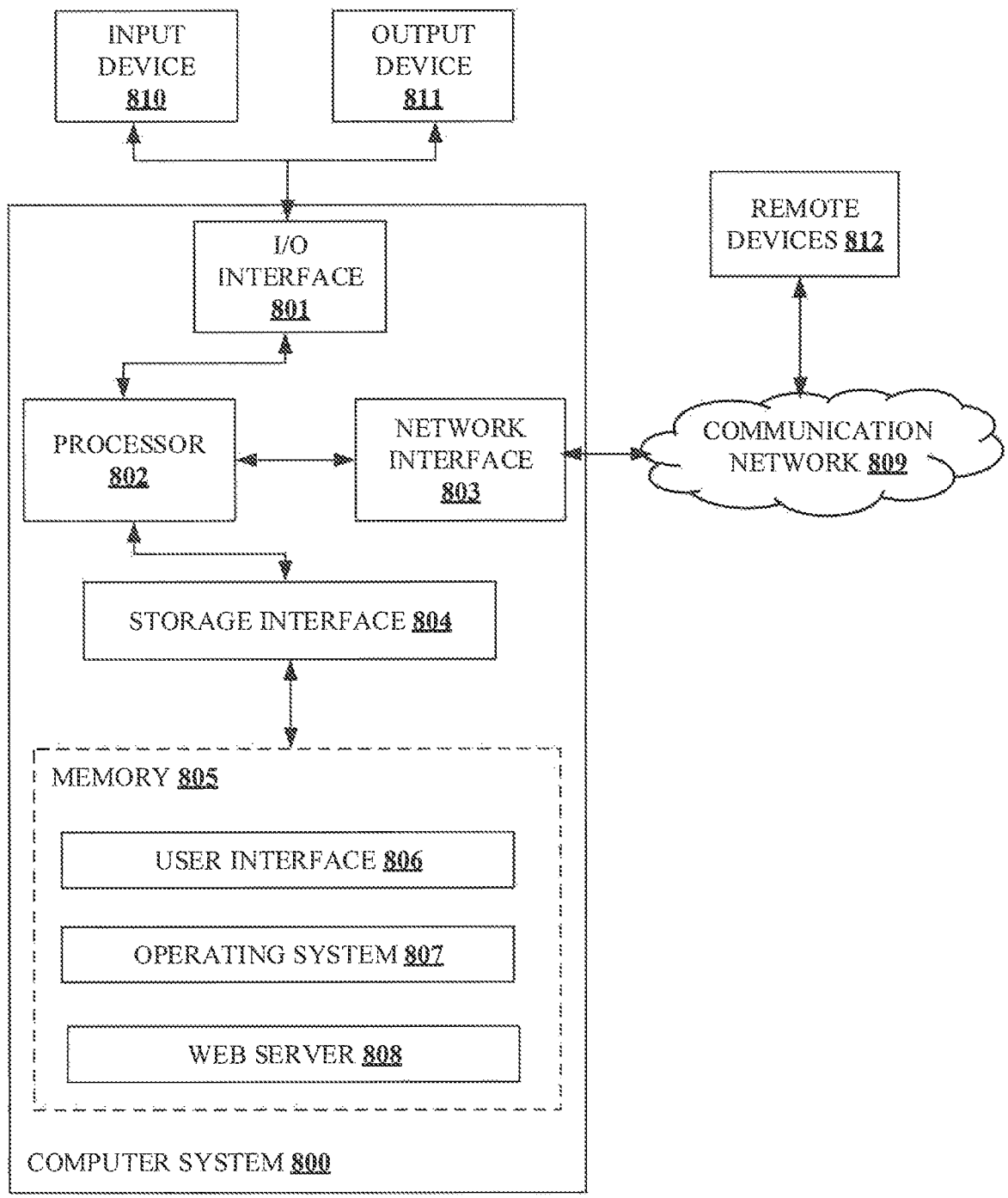

FIG. 7B shows an exemplary hierarchical clustering process, in accordance with some embodiments of the present disclosure; and FIG. 8 shows a general-purpose computer system to generate abstractive summary, in accordance with embodiments of the present disclosure It should be appreciated by those skilled in the art that any block diagrams herein represent conceptual views of illustrative systems embodying the principles of the present subject matter. Similarly, it may be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and may be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "includes" "comprising", "including" or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" or "includes . . . a" does not, without more constraints, preclude the existence of other elements or additional elements in the system or apparatus.

Embodiments of the present disclosure describes a method and system for generating abstractive summary. A query is received from a user for generating an abstractive summary from a document among a plurality of documents stored in a document database. The query is split into one or more lexical units. A role is assigned to the one or more lexical units in the query and a semantic graph and a graph index is generated for the query. Further, one or more sentences having a semantic graph analogous to the generated semantic graph of the query is retrieved from the document. A measure of information of the retrieved one or more sentences is determined. Furthermore, the one or more sentences are re-ordered and re-phrased based on the computed measure of information.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1:
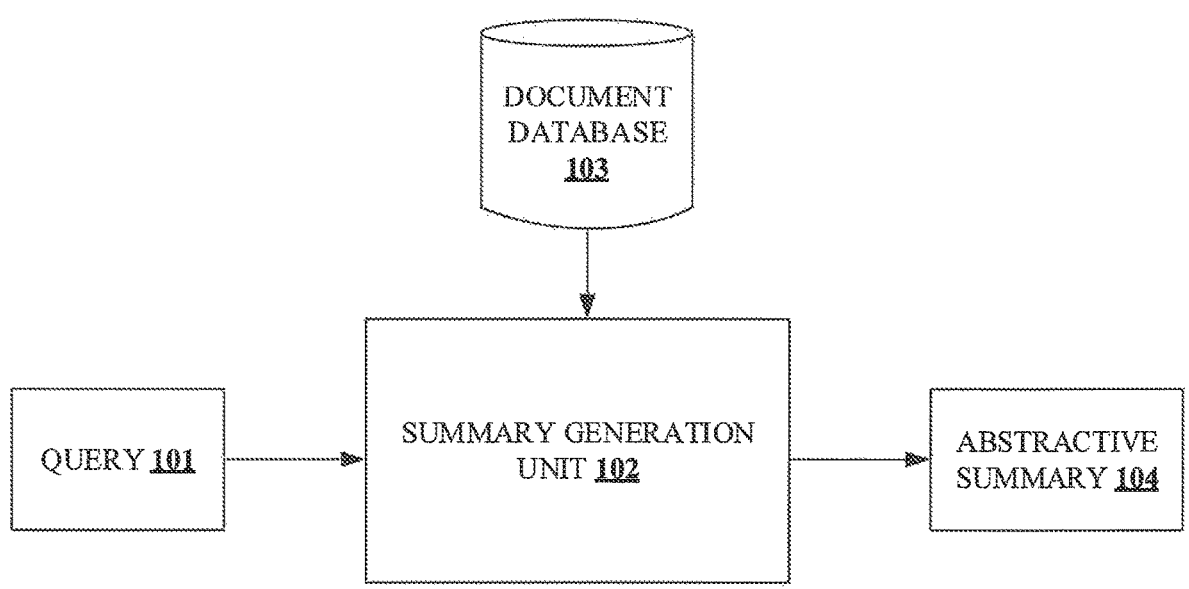
FIG. 1 shows an environment for generating an abstractive summary, in accordance with some embodiments of the present disclosure.

FIG. 1 shows an exemplary system for, in accordance with some embodiments of the present disclosure.

Generally, a document having vast information may not be understood by a person. For example, a user having minimal knowledge of legal documents may not completely understand information provided in a legal document. In such cases, the user may be provided an abstract of the information such that the user can understand the gist of the information in the legal document. Summary generation unit may be implemented to provide such an abstractive summary (104) of information of a document, upon receiving a query (101) from the user. The query (101) from the user may be a specific word or a specific context in the document. For example, in an employee agreement, an employee may query (101) about notice period. A summary may be generated about the notice period using the information in the employee agreement. In an embodiment, a user may submit a query (101) to a summary generation unit (102) for generating an abstractive summary (104) from a document. The query (101) may be split into one or more lexical units. A lexical unit may be a single word or a part of a word or a chain of words that forms the basic elements of a language's vocabulary. For the one or more lexical units in the query (101) a role may be assigned based on semantic role labelling. The semantic role labeling may be a process of assigning labels to lexical units in a sentence. The labels may indicate semantic role (for example agent, goal, recipient, goods and the like) of the lexical unit in the sentence. A semantic graph and a graph index may be generated for the query (101) using a learning model. In an embodiment, the learning model may be trained based on the role assigned to the one or more lexical units of one or more sentences from the plurality of the documents stored in the document database (103). Further, one or more sentences having a semantic graph analogous to the semantic graph generated for the query (101) may be retrieved from the document. The retrieved one or more sentences may be grouped using an Artificial Intelligence (AI) based clustering algorithm. In an embodiment, a measure of information for the retrieved one or more sentences from the document may be determined. The measure of information may include at least one of a semantic relationship between one or more lexical units of the retrieved one or more sentences with the one or more lexical units of the query (101) and a correlation score of the retrieved one or more sentences with the query (101). The measure of information may be determined using a deep learning technique. Furthermore, the retrieved one or more sentences may be reordered. Reordering the one or more sentences may include determining a semantic chain based coherence measure to the retrieved one or more sentences, identifying discourse relationship among the retrieved one or more sentences based on semantic chain, and generating an extractive summary by performing at least one of the re-ordering and removing the one or more sentences based on the coherence measure of the one or more sentences. Finally, the one or more lexical units in the retrieved one or more sentences may be re-phrased based on the measure of information. The re-phrasing of the one or more lexical units may include identifying a sequence of semantic slots in the retrieved one or more sentences and analyzing inter dependency among the semantic slots avid choosing a lexical unit based on at least one of similarity score and word embedding for rephrasing the one or more lexical units in the retrieved one or more sentences.

In an embodiment, the semantic graph for the one or more sentences in the document may be generated and stored in semantic graph data.

Figure 2:
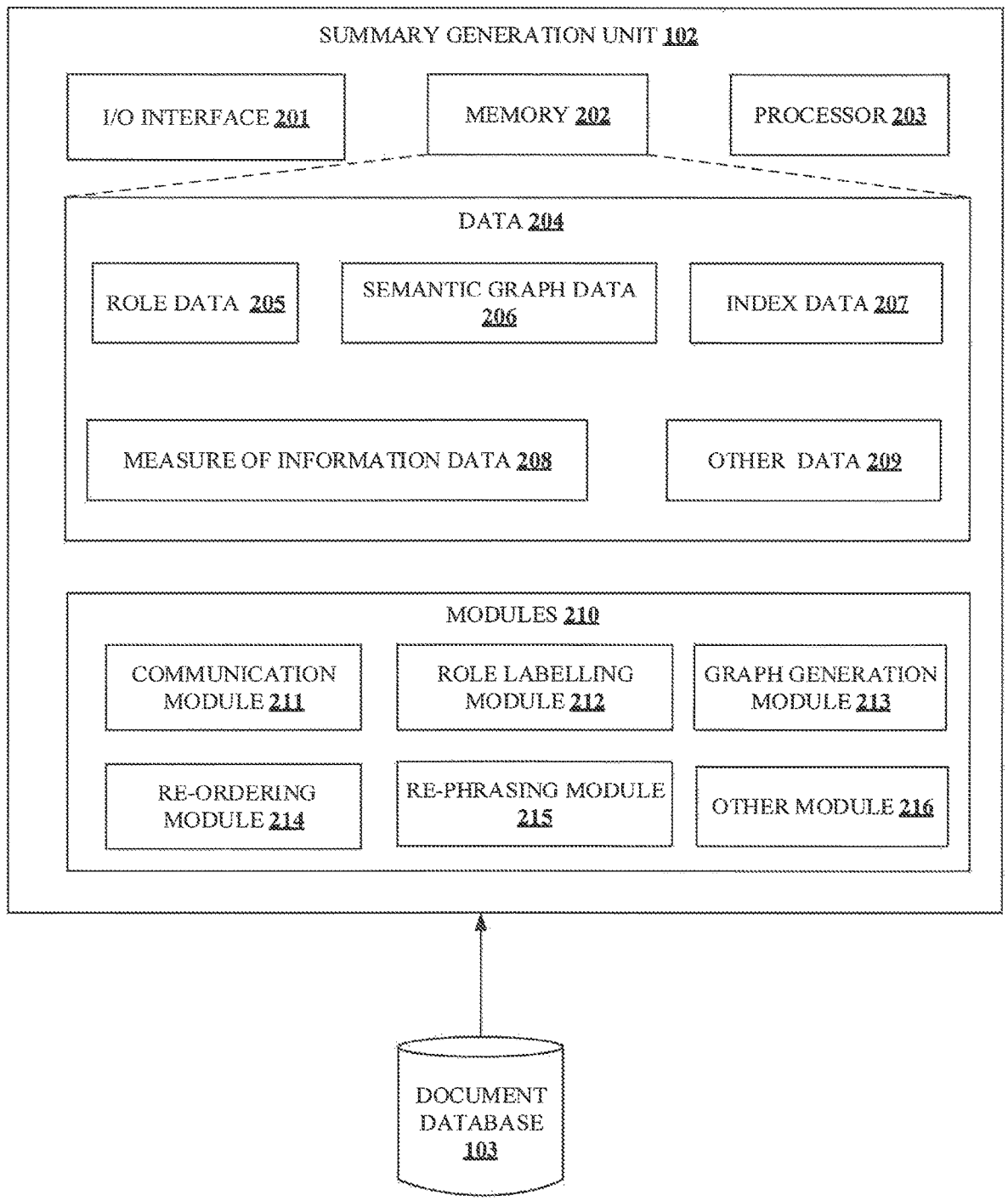
FIG. 2 shows a detailed block diagram of a summary generation unit, in accordance with some embodiments of the present disclosure.

FIG. 2 shows a detailed block diagram of a summary generation unit (102), in accordance with some embodiments of the present disclosure.

The summary generation unit (102) may include a Central Processing Unit ("CPU" or "processor") (203) and a memory (202) storing instructions executable by the processor (203). The processor (203) may include at least one data processor for executing program components for executing user or system-generated requests. The memory (202) may be communicatively coupled to the processor (203). The summary generation unit (102) further may include an Input/Output (110) interface (201). The I/O interface (201) may be coupled with the processor (203) through which an input signal or/and an output signal may be communicated. In one embodiment, the summary generation unit (102) may receive the query (101) through the I/O interface (201).

In some implementations, the summary generation unit (102) may include data (204) and modules (210). As an example, the data (204) and modules (210) may be stored in the memory (202) configured in the summary generation unit (102) as shown in the FIG. 2. In one embodiment, the data (204) relay include, for example, role data (205), semantic graph data (206), index data (207), measure of information data (208) and other data (209). In the illustrated FIG. 2, data (204) are described herein in detail.

In an embodiment, the role data (205) may include a label assigned to the one or more lexical units. The label may be indicative of asemantic role in the query (101) or one or more sentences. A semantic role in language may be a type of relationship that a syntactic constituent may have with a predicate.

In an embodiment, the semantic graph data (206) may store the semantic graph generated for the query (101) and the one or more sentences from the plurality of documents stored in the document database (103). The semantic graph of a sentence may represent meaning of the sentence in the form of a graph determined based on the role assigned to the one or more lexical units in the sentence.

In an embodiment, the index data (207) may include descriptors or other kinds of access points assigned to the one or more lexical units and to the plurality of documents in the document database (103). As shown in table of the FIG. 6 the one or more lexical units are assigned an index, acting as a descriptor to the one or more lexical units. The index data (207) may be helpful in searching the one or more sentences relevant to the query (101) in a document and searching the document n a plurality of documents relevant to the query (101).

In an embodiment, measure of information data (208) may include at least one of a semantic relationship between the one or more lexical units in the one or more sentences retrieved form the document with the one or more lexical units of the query (101). The relationship between the one or more lexical units in an ontology may include relation between a first lexical unit and a second lexical unit, A hyponymy and hypernymy relationship between the first lexical unit and the second lexical unit refers to a relationship between a general term (first lexical unit) and more specific terms (second lexical unit) under the category of the general term (first lexical unit). Further, a hyponym is a word or phrase having a semantic field more specific than its hypernym. For example, the colors red, green, blue and yellow are hyponyms (second lexical unit). The hyponyms may be categorized under the general term colors, therefore the first lexical unit colors may be the hypernym containing the hyponyms (red, green, blue and green). Other types of relationship may include holonymy, meronymy, troponym, synonymy, antonymy and homonymy. A holonym may denote the whole and a term denoting a part of, or a member of, the whole (for example, 'tree' is a holonym of 'bark', of 'trunk' and of 'limb.'). A meronym refers to the one or more lexical units describing only a part of a complete object (for example, finger is a meronym of hand because a finger is part of a hand). Synonymy refers to one or more lexical units pronounced and spelled differently but contain the same meaning (for example, happy, joyful, and glad). Antonymy refers to one or more lexical units related by having the opposite meanings to each other (for example, dead and alive). The homonymy refers to the relationship between one or more lexical units spelled or pronounced the same way but hold different meanings (for example, bank (of river) and bank (financial institution)). Further, the measure of information data (208) may include a correlation score of the retrieved one or more sentences with the query (101). The correlation score may be used to determine the relatedness of the one or more sentences with the query (101). For example, a correlation score of "1" may be treated as completely related, a correlation score of "0" may be treated as not related and a correlation score of "−1" may be treated as a contradictorily related. For example, the first sentence "If you help the needy, God will reward you." and the second sentence "Giving money to a poor man has good consequences." may be related, therefore the correlation score may be 0.8.

In an embodiment, the other data (209) may include a lexicon data for splitting the query (101) or the one or more sentences into one or more lexical units. The other data (209) may include a plurality of intent and domain data used for identifying the intent and the domain of the user query (101).

In some embodiments, data (204) may be stored in the memory (202) in form of various data structures. Additionally, the data (204) may be organized using data models, such as relational or hierarchical data models. The other data (209) may store data, including temporary data and temporary files, generated by the modules (210) for performing the various functions of the summary generation unit (102).

In some embodiments, the data (204) stored in the memory (202) may be processed by the modules (210) of the summary generation unit (102). The modules (210) may be stored within the memory (202). In an example, the modules (210) communicatively coupled to the processor (203) configured in the summary generation unit (102), may also be present outside the memory (202) as shown in FIG. 2 and implemented as hardware. As used herein, the term modules (210) may refer to an application specific integrated circuit (ASIC), a FPGA (Field Programmable Gate Array), an electronic circuit, a processor (203) (shared, dedicated, or group) and memory (202) that execute one or more software or firmware programs, a combinational logic circuit, and/or other suitable components that provide the described functionality. In some other embodiments, the modules (210) may be implemented using at least one of ASICs and FPGAs.

In one implementation, the modules (210) may include, for example, a communication module (211), a role labelling module (212), a graph generation module (213), a re-ordering module (214), a re-phrasing module (215) and other module (216), It may be appreciated that such aforementioned modules (210) may be represented as a single module or a combination of different modules (210).

In an embodiment, the communication module (211) may be used to receive the query (101) from the user for generating the abstractive summary (104). The communication module (211) may be used to retrieve one or more sentences present in the document database (103) for generating abstractive summary (104). The communication module (211) may be used to communicate (for example display or transmit) the generated abstractive summary (104) to the user.

In an embodiment, the role labelling module (212) may be used to assign the role to at least one of the query (101), the one or more lexical units in the query (101), one or more lexical units in the one or more sentences and the one or more sentences in the document among the plurality of the documents stored in the document database (103). A semantic role labelling technique may be used to assign labels to the one or more lexical units for example an agent, goal, and a result. A semantic role in language may be a type of relationship between the one or more lexical units and a predicate (for example verb). The role labelling may be performed by detecting the one or more lexical units associated with the predicate or verb in the one or more sentences and classifying the one or more lexical units into specific roles. For example, a frame net may be used to assign role to the one or more lexical units, consider a sentence "Mary sold the book to John". The frame net may recognize the verb "to sell" as representing the predicate, "Mary" assigned the role of the seller (agent), "the book" assigned the role of the goods (theme), and "John" assigned the role of the recipient. The following one or more sentences illustrates the role assigned to the one or more lexical units based on the Frame Net semantic role labelling. The role assigned to the one or more lexical units are denoted by adding a square bracket ("[ ]") to the one or more lexical units and a role assigned as subscript word following the square bracket.

(a) If [you]$_{Agent}$ [carelessly]$_{Manner}$ chance going back there, you deserve what you get.
(b) Only [one winner]$_{Buyer}$ purchased [the paintings]$_{Goods}$.
(c) [Rachel]$_{Agent}$ injured [her friend]$_{Victim}$ [by closing the car door]$_{Means}$ In an embodiment, the graph generation module (213) may be used to generate a semantic graph and a graph index based on the role assigned to the one or more lexical units in the query (101). The semantic graph is generated using a learning model, wherein the learning model is trained based on at least one of the role assigned to the one or more lexical units in the one or more sentences, and a role assigned to the one or more sentences in the plurality of the documents. In an embodiment, the graph generation module (213) may use a recurrent neural network as the learning module for generating the semantic graph.

In an embodiment, the re-ordering module (214) may apply a semantic chain based coherence measure to the retrieved one or more sentences. The coherence among the retrieved one or more sentences may ensure meaningful ordering of the one or more sentences rather than a random concatenation of the retrieved one or more sentences. A semantic chain may include a sequence of related words in the retrieved one or more sentences, spanning short (adjacent sentences) or longer distances (entire paragraph). The coherence measure may provide the relatedness of the retrieved one or more sentences. Further, the re-ordering module (214) may identify a discourse relationship among the retrieved one or more sentences based on semantic chain. A discourse relationship may include a logical flow of events, states, propositions, argument, and story. The type of relationship may be co-reference, Event-associated arguments, Entity-Polarity information, selection restrictions and Entity-Dialog Acts. The discourse relationship may identify the logical connection between the two consecutive sentences or the semantic chains. For example, the discourse relationship may identify the one or more lexical units "In addition", "Additionally", "Further to this", "what is more" and the like to identify the logical connection between the two consecutive sentences or the semantic chains. Finally, the re-ordering module (214) may generate an extractive summary by performing at least one of the re-ordering and removing the one or more sentences based on the coherence measure of the one or more sentences.

For example, given a query (101) "What are the things we can see in Rome?" the retrieved one or more sentences from a document may be as follows:

"Firstly, mould lave to see the Colosseum. The Colosseum's original Latin name was Amphitheatrum Flavium, often anglicized as Flavian Amphitheatre, after Emperor Nero, whose statue once stood near its location. Emperors of the Flavian dynasty constructed the building following the reign of Nero. Secondly, I'm sure the pope is saying to meet me."

The re-ordering module (214) may apply a coherence measure on the retrieved one or more sentences, identify the discourse relationship between the retrieved one or more sentences and generate an extractive summary by removing and re-ordering the retrieved one or more sentences as follows:

"Firstly, I would love to see the Colosseum. Secondly, I'm sure the pope is dying to meet me."

In an embodiment, the re-phrasing module (215) may include identifying a sequence of semantic slots in the retrieved one or more sentences. To understand the meaning of the one sir more sentences or the query (101) the re-phrasing module (215) may assign a tag to the one or more lexical units in the one or more sentences or the query (101) providing a meaning to the one or more sentences or the query (101). The process of assigning a tag to the one or more lexical units includes identifying the sequence of semantic slots in the retrieved one or more sentences. An encoder-decoder learning model, where two Recurrent Neural Networks (RNNs) may be trained jointly to encode a query (101) or the retrieved one or more sentences into a vector and decode the vector into a sequence of semantic slots. For example, consider a query (101) "Show me all the Buses from Kolkata to Bhubaneshwar on Friday". The re-phrasing module (215) using an encoder-decoder model may identify a sequence of semantic slots as a source location (Kolkata), a destination location (Bhubaneshwar), Date or day (Friday). Further, the re-phrasing module (215) may analyze inter dependency among the semantic slots and choose a lexical unit based on at least one of similarity score and word embedding for rephrasing the one or more lexical units in the retrieved one or more sentences. The inter dependency among the semantic slots may be analyzed by splitting the semantic slots into mandatory semantic slot and optional semantic slot based on the predicate or the verb and other roles present in the retrieved one or more sentences. For example, the semantic slots having the role "Agent" and "Object" and related to the verb or predicate in the retrieved one or more sentences may be categorized as mandatory semantic slot. The semantic slots having the role "Instruction", "Date", "Constraints" and the like in the retrieved one or more sentences may be categorized as optional semantic slot. The optional semantic slots provide additional information and enhance the informativeness of the retrieved one or more sentences. For example, consider a sentence "Show me all the Buses from Kolkata to Bhubaneshwar on Friday". The one or more lexical units "Kolkata" and "Bhubaneshwar" may be categorized as the mandatory semantic slots and the one or more lexical units "Bus" and "Friday" may be categorized as optional semantic slots based on the predicate or the verb "show". The re-phrasing module (215) may choose a lexical unit for rephrasing the one or more lexical units in the retrieved one or more sentences based on the similarity score and word embedding using a spacy vector model. For example, the spacy vector model may use a cosine-based similarity model to generate the similarity score among the one or more retrieved sentences or the one or more lexical units. Based on the similarity score generated among the one or more lexical units a lexical unit may be selected for rephrasing the retrieved one or more sentences. For example, consider a sentence "The car is wilting" where the ("car") indicates a semantic slot to be re-phrased in the sentence. The spacy vector model may generate one or more lexical units such as "plant" having a similarity score of 0.92 and "building" having a similarity score of 0.3 and the like. Based on the similarity score generated by the spacy vector model, the lexical unit "plant" may be used to rephrase the lexical unit "car". Therefore, the re-phrased sentence may be "The plant is wilting".

In an embodiment, the other module (216) may be used to search the one or more sentences in the document based on the graph index data (207) having a semantic graph analogous to the semantic graph of the query (101). The other module (216) may include clustering algorithms to group the one or more retrieved sentences. The other module (216) may include a correlation score computing algorithm and intent and domain identification techniques.

Figure 3:
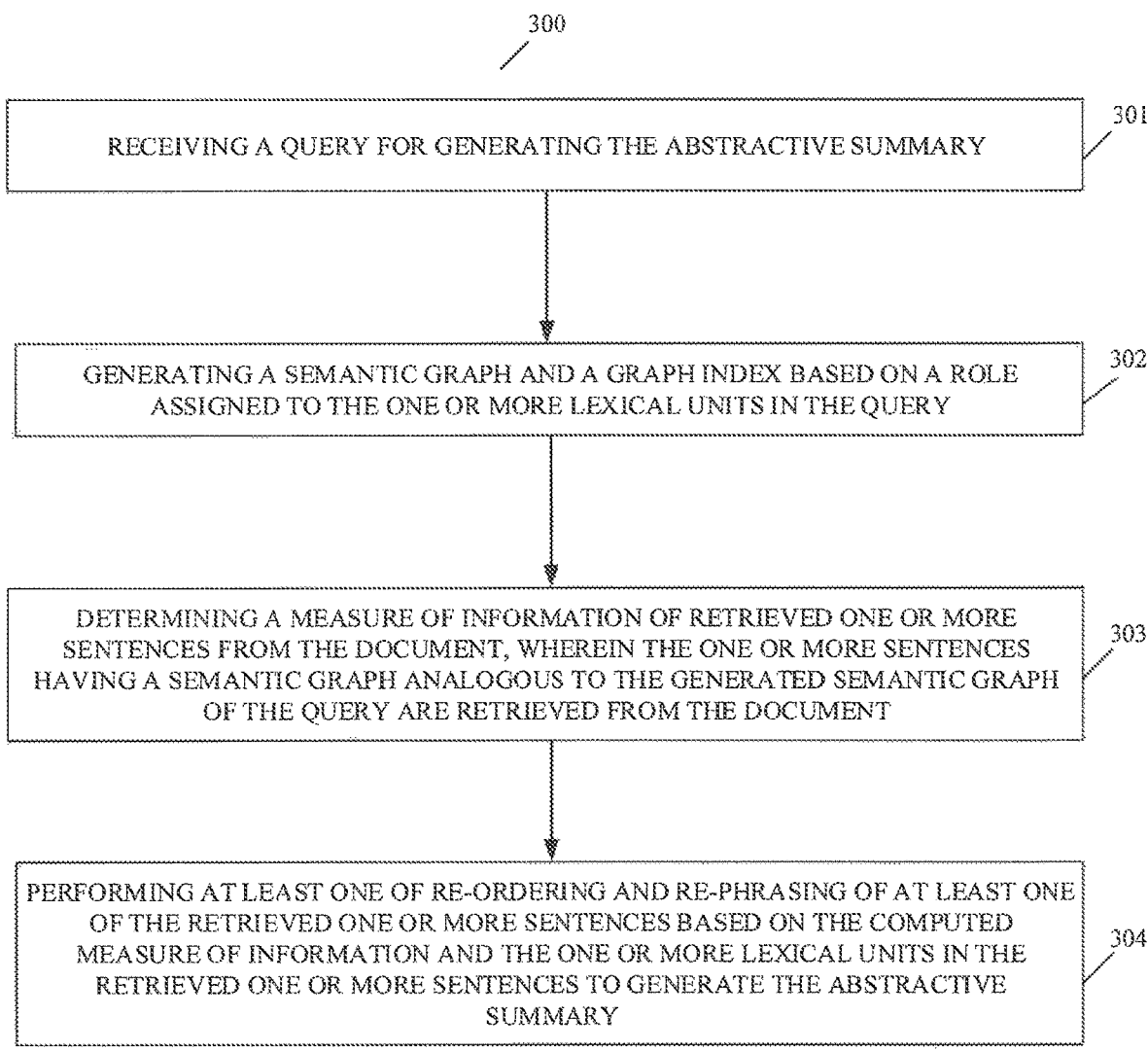
FIG. 3 shows a flowchart illustrating method for generating abstractive summary, in accordance with some embodiment of the present disclosure.

FIG. 3 shows a flowchart illustrating method for generating an abstractive summary (104), in accordance with some embodiment of the present disclosure.

The order in which the method 300 may be described is not intended to be construed as a limitation, and any number of the described method blocks may be combined in any order to implement the method. Additionally, individual blocks may be deleted from the methods without departing from the scope of the subject matter described herein. Furthermore, the method may be implemented in any suitable hardware, software, firmware, or combination thereof.

At the step 301, the receiving by the communication module (211), a query (101) for generating the abstractive summary (104) from a document among a plurality of documents stored in a document database (103). The summary generation unit (102) may split the query (101) into one or more lexical units. In an embodiment, the query (101) from the document may be received from the user.

For example, consider a document comprising information on a game of cricket. Also, consider the document for generating the abstractive summary (104) having the following text "Cricket is a bat-and-ball game played between two teams of eleven players on a field at the center of which is a 20-metre (22-yard) pitch with a wicket at each end, each comprising two balls balanced on three stumps. The batting side scores runs by striking the ball bowled at the wicket with the bat, while the bowling and fielding side try to prevent this and dismiss each player (so they are "out"). Means of dismissal include being bowled, when the ball hits the stumps and dislodges the balls, and by the fielding side catching the ball after it is hit by the bat, but before it hits the ground. When ten players have been dismissed, the innings ends and the teams swap roles. The game is adjudicated by, two umpires, aided by a third umpire and match referee in international matches. They communicate with two off-field scorers who record the match's statistical information. There are various formats ranging from Twenty20, played over a few hours with each team batting for a single innings of 20 overs, to Test matches, played over five days with unlimited overs and the teams each batting for two innings of unlimited length. Traditionally cricketers play in all-white kit, but in limited overs cricket they wear club or team colors. In addition to the basic kit, some players wear protective gear to prevent injury caused by the ball, which is a hard, solid spheroid made of compressed leather with a slightly raised sewn seam enclosing a cork core which is layered with tightly wound string. Historically, cricket's origins are uncertain, and the earliest definite reference is in south-east England in the middle of the 15th century. It spread globally with the expansion of the British Empire, leading to the first international matches in the second half of the 19th century. The game's governing body is the International Cricket Council (ICC), which has over 100 members, twelve of which are gall members who play Test matches. The game's rules are held in a code called the Laws of Cricket which is owned and maintained by Marylebone Cricket Club (MCC) in London. The sport is followed primarily in the Indian subcontinent, Australasia, the United Kingdom, Ireland, southern Africa and the West Indies, its globalization occurring during the expansion of the British Empire and remaining popular into the 21st century. Women's cricket which is organized and played separately, has also achieved international standard. The most successful side playing international cricket is Australia, having won seven One Day international trophies, including five World Cups, more than any other country and having been the top-rated Test side more than any other country".

Consider a user query (101) "Difference between Twenty20 and Test matches?". The summary generation unit (102) splits the query (101) into one or more lexical units as follows "Difference", "between", "Twenty20", "and", "Test matches". In some embodiments, the query (101) may be a text which is input into the summary generation unit (102) via a keyboard or a touchpad or a touchscreen. In some embodiments, the query (101) may be a voice signal input via a microphone associated with the summary generation unit (102). In some embodiments, the query (101) may be selected by the user in the document. Considering the above example, when the document is displayed to the user, the user may select a particular sentence or word as a query (101).

At the step 302, generating, by the summary generation unit (102) a semantic graph and a graph index based on a role assigned to the one or more lexical units in the query (101). The role may be assigned to the one or more lexical units in the query (101) based on semantic role labelling. The semantic graph may be generated using a learning model. The learning model may be trained based on at least one of the role assigned to the one or more lexical units in the one or more sentences, and a role assigned to the one or more sentences in the document. In an embodiment, a frame net may be used to assign role to the one or more lexical units and Recurrent Neural Network (RNN) may be used to generate the semantic graphs. In a further embodiment, a Lucene indexing may be used to generate the graph index. As shown in FIG. 4, the table illustrates exemplary roles in the English language, a definition of the corresponding role and an example of role assigned to the one or more lexical units in a sentence indicated by the square brackets ("H"). For example, consider first row of the FIG. 4, where the role "AGENT" is the subject responsible for an event in the one or more sentences. In the example sentence of the row 1 in the FIG. 4, for the sentence "The [waiter] spilled the soup" the one or more lexical units "[waiter]" is the subject responsible for the event "spilled the soup".

Figure 5:
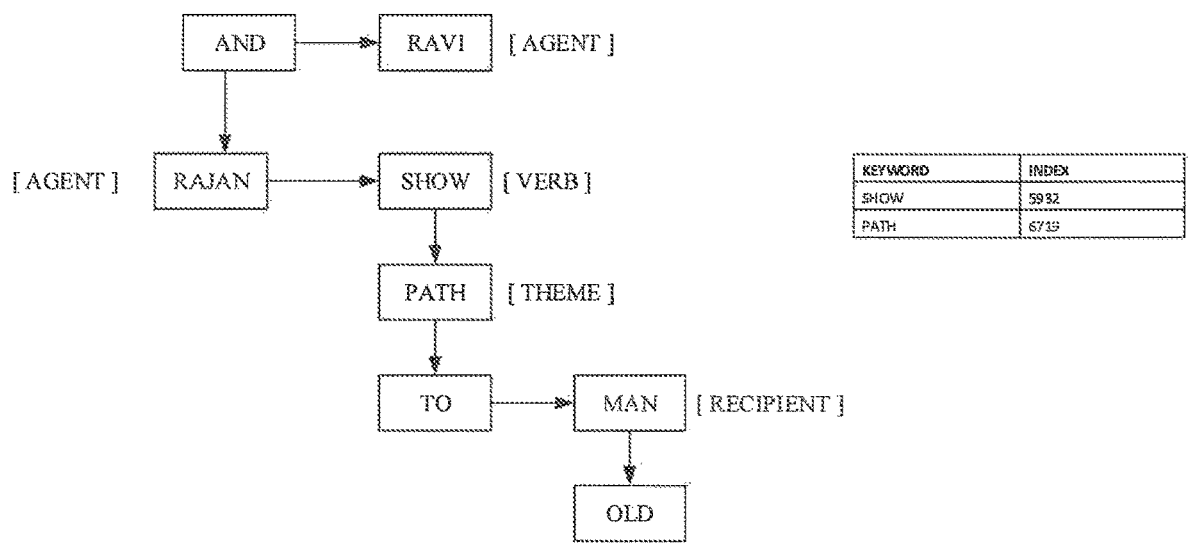
FIG. 5 shows an exemplary semantic graph generated for a sentence, in accordance with some embodiments of the present disclosure.

As shown in FIG. 5, the semantic graph for the sentence "RAVI AND RAJAN SHOWED PATH TO AN OLD MAN" includes the meaning for the sentence in the form of a graph. The roles assigned to the one or more lexical units are indicated within the square brackets ("H") as shown in FIG. 5. The one or more lexical units "RAVI" and "RAJAN" assigned the role of "AGENT", "SHOW" is assigned a role "VERB", "PATH" is assigned a role "THEME" and "MAN" is assigned a role "RECIPIENT". The semantic graph as shown in the FIG. 5 is generated based on the role assigned to the one or more lexical units, delivers the meaning of the "Agent" performing an "Action" indicated by the verb based on the "Theme" to help the "Recipient".

Figure 6:
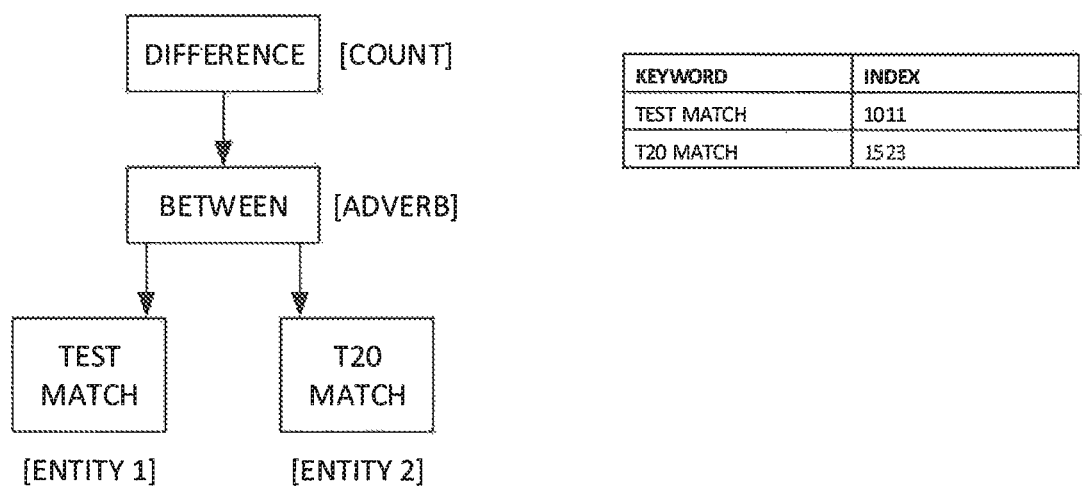
FIG. 6 shows an exemplary semantic graph generated for a query provided by a user, in accordance with some embodiments of the present disclosure.

As shown in the FIG. 6, a semantic graph is constructed based on the role assigned to the one or more lexical units in the query (101) "Difference between Twenty20 and Test matches?". The role assigned to the one or more lexical units in the query (101) is denoted within the square brackets ("[ ]"). Further, the index assigned to the one or more lexical units (Keywords) is denoted in the table of the FIG. 6.

At the step 303, the summary generation unit (102) may retrieve the one or more sentences having a semantic graph analogous to the generated semantic graph of the query (101) from the document based on intent and domain of the query (101), The intent and domain may be determined based on the role assigned to at least one of the query (101), the one or more lexical units in the query (101) and one or more sentences in the document among the plurality of the documents stored in the document database (103). The intent may relate events the user is willing to perform for example make a reservation, purchase an item, make a return and the like. The domain may be a collection of intents (things a user might want to do). For example, consider a query (101) "What are the legal decisions that cite Article 1382 of the Civil Code?". The intent may be "legal decision" identified based on the role assigned to the one or more lexical units for example "Article 1382" and "Civil Code". The domain may be identified as "judicial" based on the identified intent. In an embodiment the domain may be used to retrieve one or more documents from the plurality of documents for generating the abstractive summary (104). Further, the intent may be used to retrieve the one or more sentences from the one or more documents having a semantic graph analogous to the semantic graph of the query (101). Further, the summary generation module may determine a measure of information of retrieved one or more sentences. The measure of information may be determined using a deep learning technique. The measure of information may include at least one of a semantic relationship between one or more lexical units of the retrieved one or more sentences with the one or more lexical units of the query (101) and a correlation score of the retrieved one or more sentences with the query (101).

The retrieved one or more sentences from the document for the query (101) "Difference between Twenty20 and Test matches?" may be as follows "There are various formats ranging from Twenty20, played over a few hours with each team batting for a single innings of 20 overs, to Test matches, played over five days with unlimited avers and the teams each batting for two innings of unlimited length. The game's governing body is the International Cricket Council (ICC), which has over 100 members, twelve of which are full members who play Test matches. The most successful side playing international cricket is Australia, having won seven One Day International trophies, including five World Cups, more than any other country and having been the top-rated Test side more than any other country."

Let us consider that the measure of information for the first sentence "There are various formats ranging from Twenty20, played over a few hours with each team batting for a single innings of 20 overs, to Test matches, played over, five days with unlimited avers and the teams each batting for two innings of unlimited length." may have a correlation score of 0.93, the second sentence "The game's governing body is the International Cricket Council (ICC), which has over 100 members, twelve of which are full members who play Test matches." may have a correlation score of 0.71 and the third sentence "The most successful side playing international cricket is Australia, having won seven One Day International trophies, including five World Cups, more than any other country and having been the top-rated Test side more than any other country" may have a correlation score of 0.43.

The retrieved one or more sentences may be grouped using AI based clustering algorithm. The clustering algorithms may group a set of similar objects into clusters. In an embodiment, a hierarchical clustering may be used to group the retrieved one or more sentences. The hierarchical clustering may be a method of cluster analysis used to build a hierarchy of clusters. Broadly the hierarchical clustering can be categorized into two types namely Agglomerative and Divisive. The agglomerative method is a "bottom-up" approach wherein each data point (or a lexical unit) starts its own cluster, and pairs of clusters are merged until the document is formed as a single cluster, as one moves up the hierarchy. The divisive method is a "top-down" approach where all data points (or entire document), start in one cluster, and the one or more sentences in the document splits are performed recursively as one moves down the hierarchy till the one or more lexical units form a cluster. As shown in FIG. 7A, a hierarchical clustering using Agglomerative method is performed on the one or more data points. Let the alphabets "A", "B", "C", "D", "E", "F" be the one or more lexical units or data points to be clustered. The hierarchical clustering initially groups all the alphabets as individual clusters as shown in FIG. 7B and based on the distance one or more clusters are merged to form a new duster and the same is performed till a single duster is obtained. For example, the alphabets "B" and "C" being closer is formed as a cluster and the alphabets "D" and "E" being closer is formed as a cluster as shown in FIG. 7B. Further, the alphabet "F" being closer to "DE" is combined to form a cluster "DEF" and the cluster "BC" is merged with the cluster "DEF" to form a cluster "BCDEF" as shown in FIG. 7B. Finally, the alphabet "A" is merged with the cluster "BCDEF" to form a single cluster "ABCDEF" as shown in the FIG. 7B.

For the retrieved one or more sentences for the query (101) "Difference between Twenty20 and Test matches?", the Hierarchical clustering may be applied, and the retrieved one or more sentences may be clustered into 3 independent clusters as given below:

Cluster 1: "There are various formats ranging from Twenty20, played over a few hours with each team batting for a single innings of 20 overs, to Test matches, played over five days with unlimited overs and the teams each batting for two innings of unlimited length".

Cluster 2: "The game's governing body is the International Cricket Council (ICC), which has over 100 members, twelve of which are full members who play Test matches".

Cluster 3: "The most successful side playing international cricket is Australia, having won seven One Day International trophies, including five World Cups, more than any other country and having been the side more than any other country"

At the step 304, the summary generation unit (102) may perform at least one of re-ordering and re-phrasing of at least one of the retrieved one or more sentences based on the computed measure of information and the one or more lexical units in the retrieved one or more sentences to generate the abstractive summary (104). The re-ordering of the retrieved one or more sentences may be performed by determining a semantic chain based coherence measure to the retrieved one or more sentences, identifying discourse relationship among the retrieved one or more sentences based on a semantic chain and generating an extractive summary by performing at least one of the re-ordering and removing the one or more sentences based on the coherence measure of the one or more sentences.

Further, the re-phrasing of the retrieved one or more lexical units may include identifying sequence of semantic slots in the retrieved one or more sentences and analyzing inter dependency among the semantic slots and choosing a lexical unit based on at least one of similarity score and word embedding for rephrasing the one or more lexical units in the retrieved one or more sentences.

Further, the hierarchical clustering may be used to remove a sentence from the retrieved one or more sentences conveying the same information. For example, if redundant sentences are retrieved, such sentences may be identified and deleted using the hierarchical clustering. Also, the one or more sentences related with each other may be used to select the optimal sentence for generating the abstractive summary (104) based on the measure of information of the retrieved one or more sentences. The retrieved one or more sentences after re-ordering may be as follows "There are various formats ranging from Twenty20, played over a few hours with each team batting for a single innings of 20 overs, to Test matches, played over five days with unlimited overs and the teams each batting for two innings of unlimited length." The one or more sentences retrieved and grouped under Cluster 2 and Cluster 3 may removed based on the measure of information.

The re-ordered one or more sentences may be re-phrased to generate the abstractive summary (104) as follows "Twenty match has single innings 20 overs and test match has two innings of unlimited overs." for the query (101) "Difference between Twenty20 and Test matches?".

Thus, the generation of abstractive summary (104) retrieves one or more sentences from the document based on the semantic role assigned to the one or more lexical units. The abstractive summary (104) is generated based on the intent and domain of the query (101). One sentence from the retrieved one or more sentences conveying same information is selected and redundant sentences are removed. The retrieved one or more sentences are re-ordered and re-phrased to generate the abstractive summary (104).

FIG. 8 illustrates a block diagram of an exemplary computer system (800) for implementing embodiments consistent with the present disclosure. In an embodiment, the computer system (800) may be used to implement the method for generating the abstractive summary (104). The computer system (800) may comprise a central processing unit ("CPU" or "processor") (802). The processor (802) may comprise at least one data processor for executing program components for generating the abstractive summary (104) at run time. The processor (802) may include specialized processing units such as integrated system (bus) controllers, memory (802) management control units, floating point units, graphics processing units, digital signal processing units, etc.

The processor (802) may be disposed in communication with one or more input/output (I/O) devices (not shown) via I/O interface (801). The I/O interface (801) may employ communication protocols/methods such as, without limitation, audio, analog, digital, monoaural, RCA, stereo, IEEE-(138)4, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface (801), the computer system (800) may communicate with one or more I/O devices. For example, the input device (810) may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device (811) may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system (800) is connected to the service operator through a communication network (809). The processor (802) may be disposed in communication with the communication network (809) via a network interface (803). The network interface (803) may communicate with the communication network (809). The network interface (803) may employ, connection protocols including, without limitation, direct connect, Ethernet (e.g., twisted pair 10/100/1000 Base T), transmission control protocol/Internet protocol (TCP/IP), token ring, IEEE 802.11a/b/g/n/x, etc. The communication network (809) may include, without limitation, a direct interconnection, e-commerce network, a peer to peer (P2P) network, local area network (LAN), wide area network (WAN), wireless network (e.g., using Wireless Application Protocol), the Internet, Wi-Fi, etc. Using the network interface (803) and the communication network (809), the computer system (800) may communicate with the one or more service operators.

In some embodiments, the processor (802) may be disposed in communication with a memory (805) RAM, ROM, etc. not shown in FIG. 8 via a storage interface (804). The storage interface (804) may connect to memory (805) including, without limitation, memory (202) drives, removable disc drives, etc., employing connection protocols such as serial advanced technology attachment (BATA), Integrated Drive Electronics (IDE), IEEE-1394, Universal Serial Bus (USB), fiber channel, Small Computer Systems Interface (SCSI), etc. The memory (202) drives may further include a drum, magnetic disc drive, magneto-optical drive, optical drive, Redundant Array of Independent Discs (RAID), solid-state memory (802) devices, solid-state drives, etc.

The memory (805) may store a collection of program or database components, including, without limitation, user interface (806), an operating system (807), web server (808) etc. In some embodiments, computer system (800) may store user/application data (806), such as the data, variables, records, etc. as described in this disclosure. Such databases may be implemented as fault-tolerant, relational, scalable, secure databases such as Oracle or Sybase.

The operating system (807) may facilitate resource management and operation of the computer system (800). Examples of operating systems include, without limitation, APPLE® MACINTOSH® OS X®, UNIX®, UNIX-like system distributions BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM®OS/2®, MICROSOFT® WINDOWS® (XP®, VISTA®/7/8, 10 etc.), APPLE® IOS®, GOOGLE™ ANDROID™, BLACKBERRY® OS, or the like.

In some embodiments, the computer system (800) may implement a web browser (808) stored program component. The web browser (808) may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers (808) may utilize facilities such as AJAX, DHTML, ADOBE® FLASH®, JAVASCRIPT®, JAVA®, Application Programming Interfaces (APIs), etc. In some embodiments, the computer system (800) may implement a mail server stored program component. The mail server may be an Internet mail server such as Microsoft Exchange, or the like. The mail server may utilize facilities such as Active Server Pages (ASP), ACTIVEX®, ANSI® C++/C #, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application. Programming Interface (MAPI), MICROSOFT® Exchange, Post Office Protocol (POP), Simple Mail Transfer Protocol (SMTP), or the like. In some embodiments, the computer system (800) may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the present invention. A computer-readable storage medium refers to any type of physical memory (802) on which information or data readable by a processor (803) may be stored. Thus, a computer-readable storage medium may store instructions for execution by one or more processors, including instructions for causing the processors to perform steps or stages consistent with the embodiments described herein. The term "computer-readable medium" should be understood to include tangible items and exclude carrier waves and transient signals, i.e., non-transitory. Examples include Random Access memory (802) (RAM), Read-Only memory (802) (ROM), volatile memory (802), non-volatile memory (802), hard drives, Compact Disc (CD) ROMs, Digital Video Disc (DVDs), flash drives, disks, and any other known physical storage media.

The terms "an embodiment", "embodiment", "embodiments", "the embodiment" "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it may be readily apparent that more than one device/article (whether or not they cooperate) may be used in place of a single device/article. Similarly, where more than one device or article is described herein (whether or not they cooperate), it may be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments may be apparent to those skilled in the art. The various aspects and embodiments disclosed herein are for purposes of illustration and are not intended to be limiting, with the true scope and spirit being indicated by the following claims.

REFERRAL NUMERALS

| Reference number | Description |
| --- | --- |
| 101 | Query |
| 102 | Summary generation unit |
| 103 | Document database |
| 104 | Abstractive summary |
| 201 | I/O Interface |
| 202 | Memory |

-continued

| Reference number | Description |
| --- | --- |
| 203 | Processor |
| 204 | Data |
| 205 | Role Data |
| 206 | Semantic graph data |
| 207 | Index data |
| 208 | Measure of information data |
| 209 | Other data |
| 210 | Modules |
| 211 | Communication module |
| 212 | Role Labelling module |
| 213 | Graph generation module |
| 214 | Re-ordering module |
| 215 | Re-phrasing module |
| 216 | Other module |
| 800 | Computer System |
| 801 | I/O interface |
| 802 | Processor |
| 803 | Network Interface |
| 804 | Storage Interface |
| 805 | Memory |
| 806 | User Interface |
| 807 | Operating System |
| 808 | Web Server |
| 809 | Communication Network |
| 810 | Input Device |
| 811 | Output Device |
| 812 | Remote Devices |

What is claimed is:

1. A method for generating abstractive summary, the method comprising:
   receiving, by a summary generation unit comprising a processor, a query for generating an abstractive summary from a document among a plurality of documents stored in a document database and splitting the query into one or more lexical units;
   generating, by the summary generation unit comprising the processor, a semantic graph and a graph index based on a role assigned to the one or more lexical units in the query;
   determining, by the summary generation unit comprising the processor, a measure of information of retrieved one or more sentences from the document, wherein the one or more sentences having a semantic graph analogous to the generated semantic graph of the query are retrieved from the document, wherein the measure of information comprises at least one of a semantic relationship between one or more lexical units of the retrieved one or more sentences with the one or more lexical units of the query and a correlation score of the retrieved one or more sentences with the query; and
   performing, by the summary generation unit comprising the processor, re-ordering and re-phrasing of at least one of the retrieved one or more sentences based on the determined measure of information and the one or more lexical units in the retrieved one or more sentences to generate the abstractive summary, wherein the retrieved one or more sentences are grouped using an Artificial Intelligence based clustering algorithm, and wherein re-phrasing the retrieved one or more sentences comprises identifying sequence of semantic slots in the retrieved one or more sentences, and analyzing inter dependency among the semantic slots and choosing a lexical unit based on at least one of similarity score and word embedding for rephrasing the one or more lexical units in the retrieved one or more sentences.

2. The method of claim 1, wherein the semantic graph is generated using a learning model, wherein the learning model is trained based on at least one of the role assigned to the one or more lexical units in the one or more sentences, and a role assigned to the one or more sentences in the document.

3. The method of claim 1, wherein retrieving the one or more sentences having a semantic graph analogous to the generated semantic graph of the query is based on intent and domain of the query, wherein the intent and domain is determined based on the role assigned to at least one of the query, the one or more lexical units in the query and one or more sentences in the document among the plurality of the documents stored in the document database.

4. The method of claim 3, wherein the role is assigned based on semantic role labelling.

5. The method of claim 4, wherein the measure of information is determined using a deep learning technique.

6. The method of claim 1, wherein re-ordering the retrieved one or more sentences comprises:
   determining a semantic chain based coherence measure to the retrieved one or more sentences;
   identifying discourse relationship among the retrieved one or more sentences based on semantic chain; and
   generating an extractive summary by performing at least one of the re-ordering and removing the one or more sentences based on the coherence measure of the one or more sentences.

7. A summary generation unit, for generating abstractive summary, the summary generation unit comprises:
   a processor; and
   a memory communicatively coupled to the processor, wherein the memory stores processor executable instructions, which, on execution, cause the processor to:
      receive a query for generating the abstractive summary from a document among a plurality of documents stored in a document database and splitting the query into one or more lexical units;
      generate a semantic graph and a graph index based on a role assigned to the one or more lexical units in the query;
      determine a measure of information of retrieved one or more sentences from the document, wherein the one or more sentences having a semantic graph analogous to the generated semantic graph of the query are retrieved from the document, wherein the measure of information comprises at least one of a semantic relationship between one or more lexical units of the retrieved one or more sentences with the one or more lexical units of the query and a correlation score of the retrieved one or more sentences with the query; and
      perform re-ordering and re-phrasing of at least one of the retrieved one or more sentences based on the computed measure of information and the one or more lexical units in the retrieved one or more sentences to generate the abstractive summary, wherein the retrieved one or more sentences are grouped using an Artificial Intelligence based clustering algorithm, and wherein re-phrasing the retrieved one or more sentences comprises identifying sequence of semantic slots in the retrieved one or more sentences, and analyzing inter dependency among the semantic slots and choosing a lexical unit based on at least one of similarity score and word embedding for rephrasing the one or more lexical units in the retrieved one or more sentences.

8. The summary generation unit of claim 7, wherein the processor is configured to generate the semantic graph using a learning model, wherein the learning model is trained based on at least one of the role assigned to the one or more lexical units in the one or more sentences, and a role assigned to the one or more sentences in the document.

9. The summary generation unit of claim 7, wherein the processor is configured to retrieve the one or more sentences having a semantic graph analogous to the generated semantic graph of the query is based on intent and domain of the query, wherein the intent and domain is determined based on the role assigned to at least one of the query, the one or more lexical units in the query and one or more sentences in the document among the plurality of the documents stored in the document database.

10. The summary generation unit of claim 9, wherein the processor is configured to assign the role to the one or more lexical units in the query based on semantic role labelling.

11. The summary generation unit of claim 10, wherein the processor is configured to determine the measure of information using a deep learning technique.

12. The summary generation unit of claim 7, wherein re-ordering the retrieved one or more sentences comprises:
    determining a semantic chain based coherence measure to the retrieved one or more sentences;
    identifying discourse relationship among the retrieved one or more sentences based on a semantic chain; and
    generating an extractive summary by performing at least one of the re-ordering and removing the one or more sentences based on the coherence measure of the one or more sentences.

13. A non-transitory computer readable medium including instructions stored thereon for generating abstractive summary, that when processed by at least one processor cause a device to perform operations comprising:
    receiving a query for generating an abstractive summary from a document among a plurality of documents stored in a document database and splitting the query into one or more lexical units;
    generating a semantic graph and a graph index based on a role assigned to the one or more lexical units in the query;
    determining a measure of information of retrieved one or more sentences from the document, wherein the one or more sentences having a semantic graph analogous to the generated semantic graph of the query are retrieved from the document, wherein the measure of information comprises at least one of a semantic relationship between one or more lexical units of the retrieved one or more sentences with the one or more lexical units of the query and a correlation score of the retrieved one or more sentences with the query; and
    performing re-ordering and re-phrasing of at least one of the retrieved one or more sentences based on the determined measure of information and the one or more lexical units in the retrieved one or more sentences to generate the abstractive summary, wherein the retrieved one or more sentences are grouped using an Artificial Intelligence based clustering algorithm, and wherein re-phrasing the retrieved one or more sentences comprises identifying sequence of semantic slots in the retrieved one or more sentences, and analyzing inter dependency among the semantic slots and choosing a lexical unit based on at least one of similarity score and word embedding for rephrasing the one or more lexical units in the retrieved one or more sentences.

\* \* \* \* \*